United States Patent [19]

Knudsen et al.

[11] Patent Number: 4,552,026
[45] Date of Patent: Nov. 12, 1985

[54] SENSOR FOR A VORTEX SHEDDING FLOWMETER

[75] Inventors: James K. Knudsen, South Euclid; Marion A. Keyes, IV, Chagrin Falls, both of Ohio

[73] Assignee: The Babcock & Wilcox Company, New Orleans, La.

[21] Appl. No.: 663,113

[22] Filed: Oct. 22, 1984

[51] Int. Cl.⁴ .............................................. G01F 1/32
[52] U.S. Cl. ................... 73/861.24; 73/655; 250/227; 250/231 R; 350/96.15
[58] Field of Search ...................... 73/861.24, 653, 655; 250/227, 231 R; 350/96.15, 96.29

[56] References Cited

U.S. PATENT DOCUMENTS 4,358,678 11/1982 Lawrence ........................... 250/227
4,472,628 9/1984 Whitten ............................... 250/227

FOREIGN PATENT DOCUMENTS 2131171 6/1984 United Kingdom ............. 73/861.24

Primary Examiner—Herbert Goldstein
Attorney, Agent, or Firm—Vytas R. Matas; Robert J. Edwards

[57] ABSTRACT

A fiber optic device senses the generation of vortices by measuring the torsional displacement of a bluff body mounted for rotation about its center of inertia within a fluid conduit. An internally toothed member is fixed to the outside of the fluid conduit, and an externally toothed member is fixed to the bluff body for rotation therewith and is in partial meshing relation to the externally toothed member. An optical fiber is entrained between the toothed members and has one end exposed to a light source and the opposite end connected to a detector which is operable to detect changes in the intensity of the light transmitted through the fiber. As the bluff body vibrates, the toothed members are displaced relative to one another causing changes in the radius of curvature of the segments of the optical fiber received between the teeth, thus changing the intensity of light transmitted through the fiber in proportion to the changes in the radius of curvature.

5 Claims, 5 Drawing Figures

SENSOR FOR A VORTEX SHEDDING FLOWMETER

TECHNICAL FIELD

The present invention relates to vortex shedding flowmeters, and more particularly to a fiber optic sensor for a vortex shedding flowmeter.

BACKGROUND ART

Vortex shedding flowmeters are well known in the art. Such flowmeters measure the volumetric rate of flow of a fluid in a conduit through the generation of hydrodynamic oscillations at a rate which is proportional to the flow rate. The oscillations are generated by placing a blunt obstruction or bluff in the fluid conduit, which causes vortices to be shed off the bluff body into the fluid.

There are several known means for sensing these vortices, including ultrasonic detectors, silicon strain gauges, piezoelectric devices, and self-heated thermocouples, which detect lift forces acting on the bluff body, or the flow currents caused by the vortex generation. These known techniques have several disadvantages, including limited sensitivity to flow, high sensitivity to vibration and flow-induced noise, limited temperature range, and possible difficulty associated with the use of electrical signals in potentially hazardous environments.

SUMMARY OF THE INVENTION

The present invention utilizes a fiber optic device to sense the generation of vortices by measuring the torsional displacement of the bluff body. The sensing mechanism is exterior to the fluid conduit, and the light source/detector can be remotely mounted. Therefore, the device is intrinsically capable of high temperature operation. Since the displacement of the bluff body is measured torsionally about its center of inertia, vibration sensitivity and flow noise interference can be minimized.

DESCRIPTION OF THE PREFERRED EMBODIMENT

Figure 1:
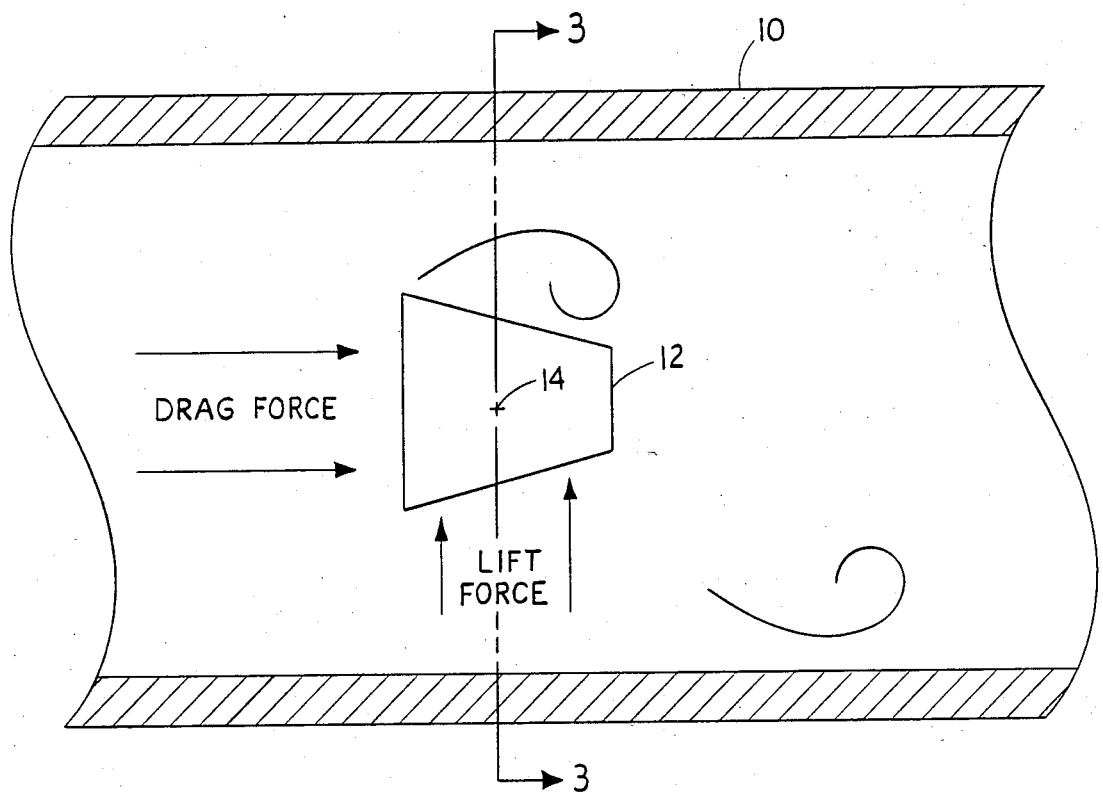
FIG. 1 is a schematic sectional view of a fluid conduit in which a bluff body is mounted.

Referring to the drawings, in which like reference characters designate like or corresponding parts throughout the several views, FIG. 1 shows a fluid conduit 10 in which a bluff body 12 is mounted, and illustrates that the variation in the drag force across the face of the bluff body due to vortex shedding provides an alternating torsional force about the center of inertia 14 of the bluff body. This is supplemented by the variation of the lift force across the lateral dimension of the body, which also alternates at the vortex shedding frequency.

Figure 2:
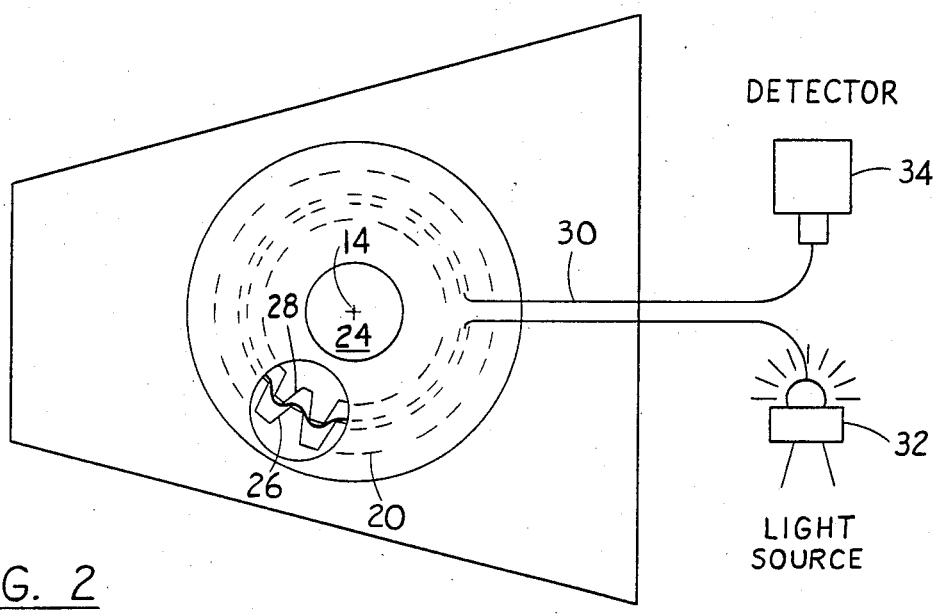
FIG. 2 is a schematic illustration, with parts cut away, of a flowmeter incorporating the invention.
Figure 3:
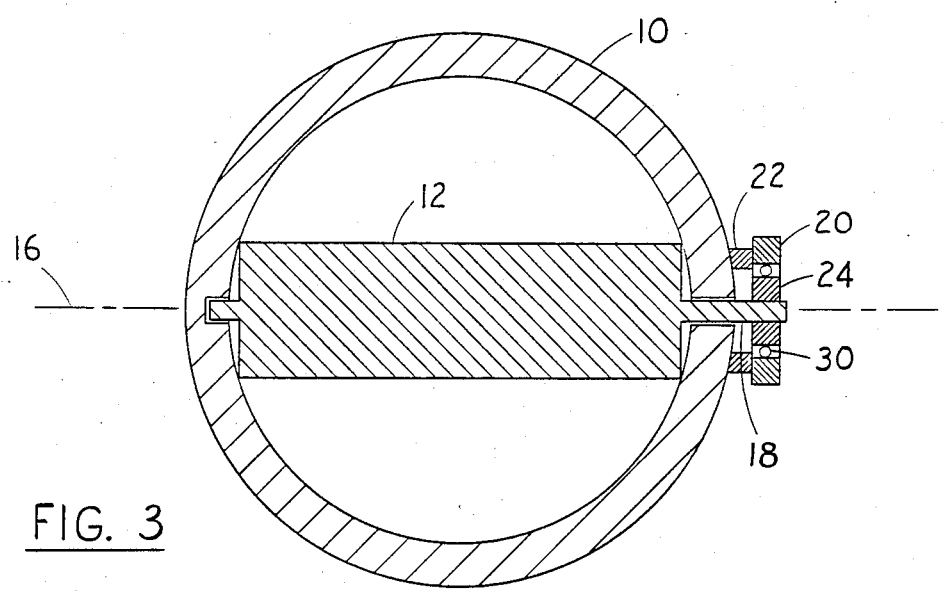
FIG. 3 is a sectional view taken along section-indicating line 3—3 of FIG. 1.

Referring to FIGS. 2 and 3, the bluff body 12 rotates about axis 16 which coincides with the center of inertia, and the torsional force acting thereon is transmitted outside the conduit 10 by means of a shaft 18 extending through the wall of the conduit through an appropriate seal (not shown).

Outside the conduit, an annular internally toothed reference member 20, which can be in the form of a ring gear, is rigidly attached to the side of the conduit, for example by attaching the member to a boss 22 fixed to the conduit. An externally toothed sensing member 24, which can be in the form of a pinion gear, is received concentrically within the internally toothed sensing member and is fixed to the shaft 18, and thus rotates with the bluff body 12. As shown more clearly in FIGS. 4a and 4b, the teeth 26 of the reference member 20 and the teeth 28 of the sensing member 24 are only partially in mesh, and an optical fiber 30 is wound between the teeth of the sensing and reference members.

Referring to FIG. 2, one end of the fiber 30 leads to a light source 32, and the other end is connected to a detector 34. The present invention is based on the fact that when the optical fiber 30 is bent over a radius a certain amount of the light transmitted by the fiber is lost from the core of the fiber to the cladding thereof, the amount of light intensity lost being inversely proportional to the radius of curvature of the bend. This change in light intensity, either that lost to the cladding or that transmitted through the fiber, can be measured by the detector 34.

Figure 4A:
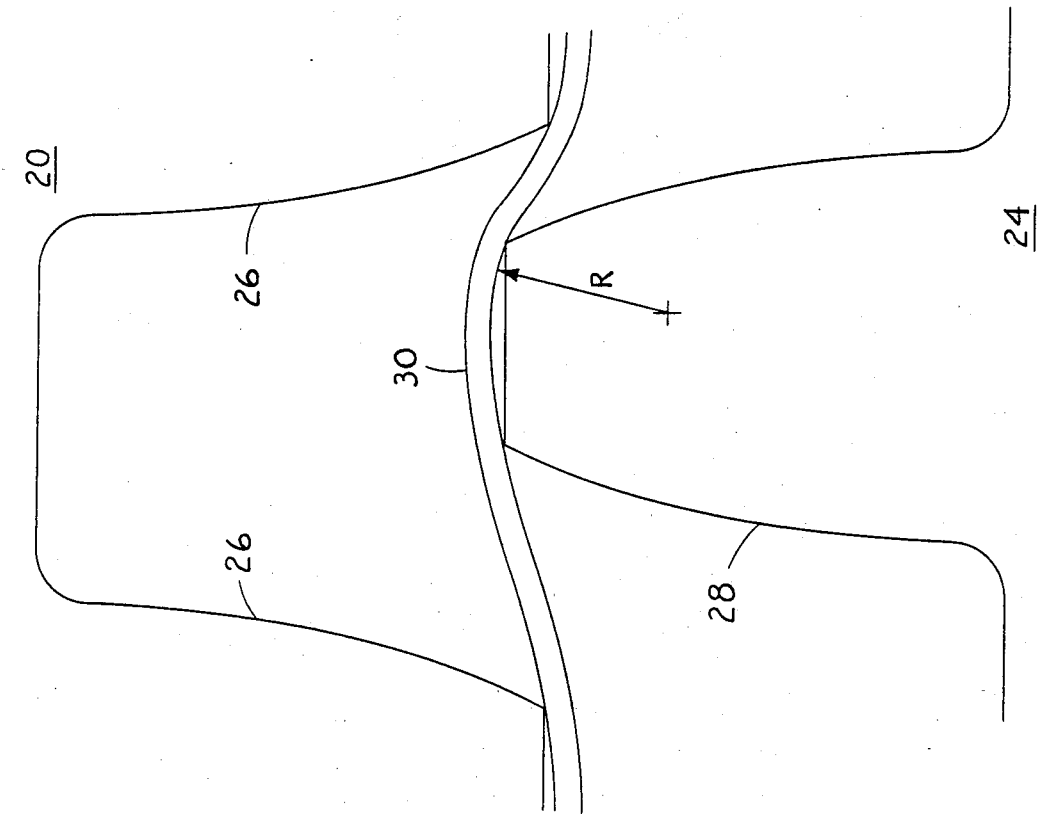
FIG. 4a and 4b are enlarged, elevation views of a portion of the sensor of the invention, shown in different operating positions.
Figure 4B:
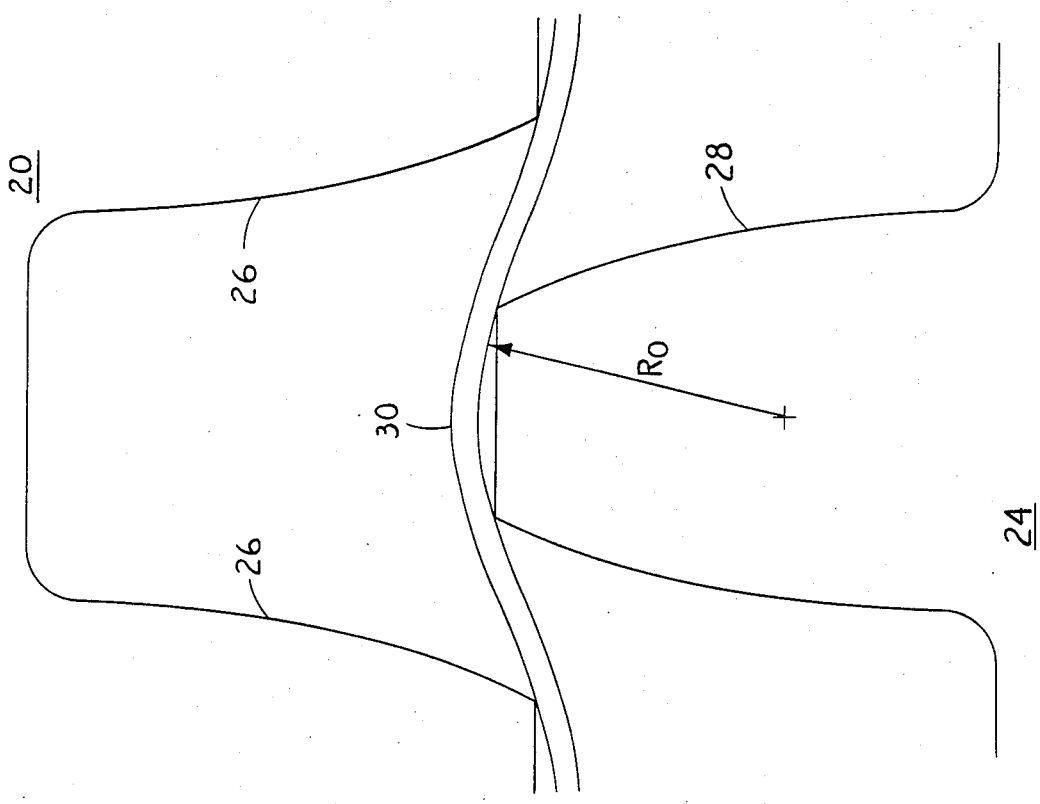

In accordance with the present invention, as fluid flows through the conduit 10, the bluff body 12 vibrates, causing relative motion between the fixed reference member 20 and the rotatable sensing member 24. As best shown in FIG. 4a and 4b, the relative movement between the members 20 and 24 changes the radius of curvature of the optical fiber 30 at each point where the fiber is received between adjacent teeth of the reference member 20 and a tooth of the sensing member 24.

FIG. 4a represents a null position of the bluff body 12 and FIG. 4b represents a deflected position. By comparing FIGS. 4a and 4b it can be seen that the radius of curvature of the optical fiber 30 changes from $R_o$ in the null position to R in the deflected position, with $R_o$ being greater than R. In operation, changes in the rate of flow of fluid in the conduit 10 will cause proportional changes in the frequency of the torsional vibration of the bluff body, and thus corresponding changes in the rate at which the radius of curvature of the optical fiber changes. As discussed above, changes in the radius of curvature result in changes in the intensity of light transmitted by the optical fiber, which are measured by the detector 34. The rate of change of the measured light intensity can then be converted to a display of the fluid flow rate in a known manner.

As shown in the preferred embodiment illustrated herein, a single optical fiber is wound between the reference and sensing members, however, in accordance with the invention, the sensitivity of the device can be increased by increasing the number of turns of the optical fiber which are wrapped between the reference and sensing members.

Certain modifications and improvements will occur to those skilled in the art upon reading the foregoing description. It will be understood that all such improvements and modifications have been deleted herein for the sake of conciseness and readability, but are properly within the scope of the following claims.

We claim:

1. In a fluid flowmeter, a bluff body adapted to induce vortex shedding when placed in a flowing fluid; means mounting said bluff body for rotation about its center of inertia; a first toothed member attached to said bluff body for rotation therewith; a second toothed member mounted in a stationary position relative to said first toothed member, the teeth of said first and second toothed members being in partial meshing relation; and an optical fiber entrained between the teeth of said first and second toothed members.

2. Apparatus as defined in claim 1, including, in combination, a fluid conduit in which said bluff body is received; and a shaft fixed to said bluff body and having its axis of rotation extending through said center of inertia, said shaft extending through a wall of said fluid conduit; said first toothed member comprising an externally toothed member fixed to said shaft, and said second toothed member comprising an internally toothed member fixed to said fluid conduit.

3. Apparatus as defined in claim 2, in which said optical fiber is entrained essentially completely around said first toothed member.

4. Apparatus as defined in claims 1, 2 or 3, including a light source directing light into one end of said optical fiber, and a detector connected to the opposite end of said optical fiber, said detector being operable to detect changes in the intensity of the light transmitted through said optical fiber.

5. Apparatus as defined in claims 2 or 3 in which said first toothed member comprises a pinion gear, and said second toothed member comprises a ring gear.

* * * * *